United States Patent
Gettemy et al.

(10) Patent No.: US 7,522,236 B2
(45) Date of Patent: Apr. 21, 2009

(54) COSMETICALLY UNIFORM REFLECTIVE BORDER AREA IN A TRANSFLECTIVE DISPLAY

(75) Inventors: Shawn R. Gettemy, San Jose, CA (US); John Z. Zhong, Cupertino, CA (US); Sherridythe Anne Fraser, Saratoga, CA (US); Wei Chen, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 543 days.

(21) Appl. No.: 11/234,789

(22) Filed: Sep. 23, 2005

(65) Prior Publication Data
US 2007/0070272 A1  Mar. 29, 2007

(51) Int. Cl.
G02F 1/1335 (2006.01)
G02F 1/1333 (2006.01)
G02F 1/1339 (2006.01)
(52) U.S. Cl. .................... 349/114; 349/110; 349/153
(58) Field of Classification Search ............. 349/110, 349/111, 114, 153
See application file for complete search history.

(56) References Cited

U.S. PATENT DOCUMENTS

| 5,696,552 A * | 12/1997 | Aritake et al. ............ 348/51 |
| 5,917,562 A * | 6/1999 | Woodgate et al. ......... 349/15 |
| 6,654,076 B2 * | 11/2003 | Ha et al. ................... 349/43 |
| 6,900,863 B2 * | 5/2005 | Okamoto et al. .......... 349/114 |
| 2003/0189680 A1* | 10/2003 | Kim et al. ................. 349/46 |
| 2004/0012671 A1* | 1/2004 | Jones et al. ............... 348/51 |
| 2004/0095528 A1* | 5/2004 | Nakamura et al. ........ 349/106 |

FOREIGN PATENT DOCUMENTS

JP        09-054554    *   2/1997

* cited by examiner

*Primary Examiner*—Mike Qi
(74) *Attorney, Agent, or Firm*—Park, Vaughan & Fleming LLP

(57) ABSTRACT

One embodiment of the present invention provides a transflective display in which a border area adjacent to an active area has a reflectivity that is substantially the same as the active area when the display is turned off. This display includes a polarizer layer, a color filter glass (CFG) layer, a liquid crystal layer, and a reflector layer. The CFG layer contains color filters in the active area, while the border area of the CFG layer is designed to have a reflectivity that is substantially the same as the active area when the display is turned off.

20 Claims, 4 Drawing Sheets

COSMETICALLY UNIFORM REFLECTIVE BORDER AREA IN A TRANSFLECTIVE DISPLAY

BACKGROUND

1. Field of the Invention

The present invention generally relates to transflective liquid crystal displays. More specifically, the present invention relates to a reflective border area in a transflective display which is cosmetically similar to an active area of the display when the display is turned off.

2. Related Art

Explosive growth in the popularity of mobile communication and computing devices has created a burgeoning demand for low-power displays. Recently-developed transflective color displays provide the ability to display information in a low-power, reflective mode as well as through a transmissive mode which uses a backlight. Transflective displays offer a compromise between purely transmissive or reflective displays, since they can function reflectively in bright sunlight, but can also be backlit when needed in low-light conditions.

Unfortunately, existing transflective color displays suffer from a cosmetic problem in some situations. Transflective color displays typically have a black mask bordering the active pixels. However, in a white transflective display, the active pixels are white when the display is turned off. This results in a cosmetically undesirable combination of a white active area bordered by the black mask, with the black mask in turn bordered by the color of the housing. Thus, when the display is turned off it has a non-uniform appearance that is cosmetically undesirable.

Hence, what is needed is an apparatus and a method for alleviating the above-described cosmetic problem with transflective displays.

SUMMARY

One embodiment of the present invention provides a transflective display in which a border area adjacent to an active area has a reflectivity that is substantially the same as the active area when the display is turned off. This display includes a polarizer layer, a color filter glass (CFG) layer, a liquid crystal layer, and a reflector layer. The CFG layer contains color filters in the active area, while the border area of the CFG layer is designed to have a reflectivity that is substantially the same as the active area when the display is turned off.

In a variation on this embodiment, a given pixel in the active area of the CFG layer includes a transmissive hole through which light from a backlight is transmitted. Instead of a transmissive hole, a given pixel in the border area of the CFG layer includes a black mask region whose size and location within the pixel are substantially the same as for the transmissive hole for a pixel in the active area.

In a further variation on this embodiment, the size and location of the black mask areas within pixels in the border area are adjusted to match the reflectivity of pixels in the active area when the display is turned off.

In a variation on this embodiment, a given pixel in the CFG layer additionally includes a clear hole that allows ambient light to reflect more directly off of the reflector layer and can be adjusted in size to tune the color point of the pixel. The size of the clear hole in the border area can differ from the size of the clear hole in the active area to adjust the reflectivity of the border area to be substantially the same as for the active area.

In a variation on this embodiment, the pixel size in the border area is different from the pixel size in the active area. Note that varying a pixel's size can adjust the pixel's light aperture ratio, and can thereby change the pixel's reflectivity.

In a further variation on this embodiment, the size of pixels in the border area can vary.

In a variation on this embodiment, the distance between the CFG layer and the reflector layer, known as the cell gap, can vary between the border area and the active area, wherein changing the cell gap in the border area changes the reflectivity of the border area.

In a variation on this embodiment, the surface roughness of the reflector layer in the border area varies from the surface roughness of the reflector layer in the active area, thereby modifying the reflectivity of the border area.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Transflective Displays

In an ideal manufacturing process, the device housing precisely borders the edge of a display's active area on all sides. However, since such precision is beyond achievable tolerances of existing cost-effective manufacturing technologies, transflective displays typically include a visible border region between the active area of the display and the device housing. This border region can compensate for some amount of misalignment between the display and the housing. A 'border' is used to denote any area immediately or mediately adjacent to the active area of a display. It need not completely encircle the active area.

Figure 1:
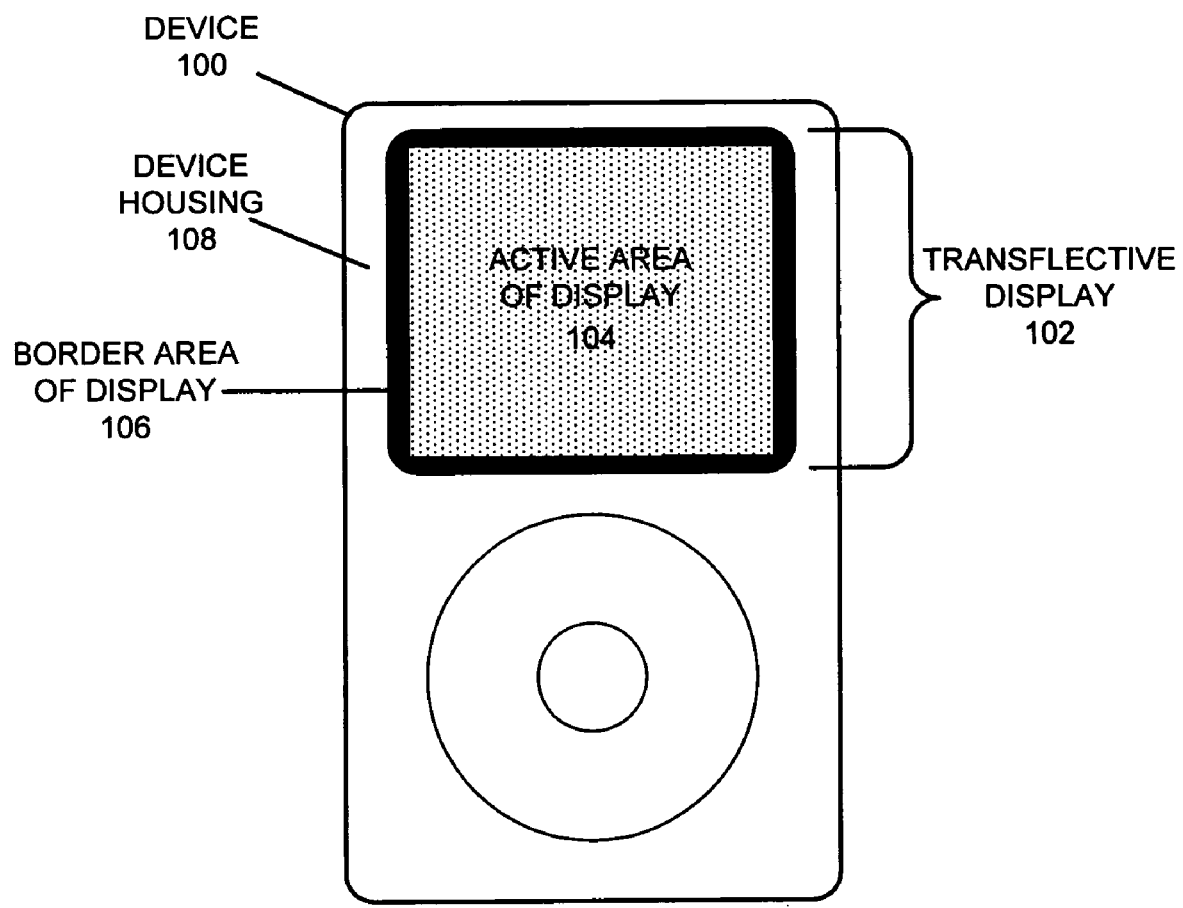
FIG. 1 illustrates a device with a transflective display in accordance with an embodiment of the present invention.

For example, FIG. 1 illustrates a device 100 with a transflective display 102. The transflective display 102 includes an active area 104 and a border area 106. The border area 106 does not include addressable pixels nor backlighting capabilities, and has different reflective properties than the active area. The difference in reflectivity, due in part to the presence of a black mask in the border area, results in a darker color that gives the appearance of a black line between the active area 104 and the device housing 108. Note that the border area can be larger, smaller, or more irregular than shown in FIG. 1.

A common practice in display design is to copy the features of either the reflective or the transmissive portions of the active area into the border area. However, because the active and non-active areas have different optical properties, this approach still results in differing reflectivities in the different regions. The present invention minimizes the visibility of the border area when the device is powered off by minimizing the optical difference between the active and border areas in transflective displays.

Figure 2:
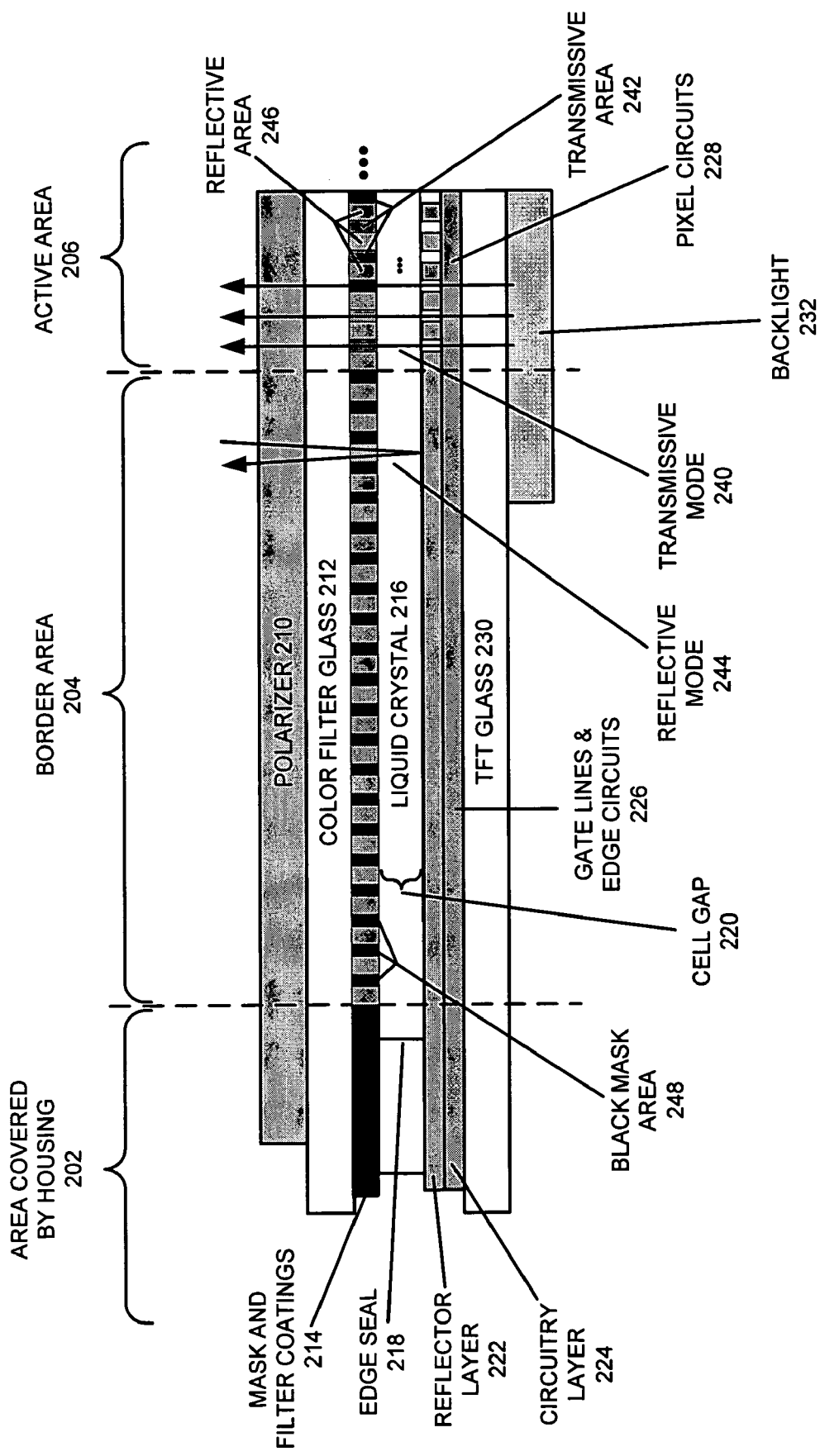
FIG. 2 illustrates a cross-sectional view of the components of a transflective color display in accordance with an embodiment of the present invention.

FIG. 2 illustrates a cross-sectional view of the components of a transflective color display. More specifically, FIG. 2 illustrates a portion of the display's border area 204 and active area 206, as well as a portion of the area covered by the device housing 202. The transflective display is composed of layers of material that include:

- a polarizer 210;
- a layer of color filter glass (CFG) 212 coated with a combination of a black mask and red, green, and blue color filters 214;
- a layer of liquid crystal 216 bordered by an edge seal 218, that has a width specified by the cell gap 220;
- a reflector layer 222 that is opaque in the border area but has transmissive holes in the active area that allow light from the backlight 232 to pass through;
- a circuitry layer 224 that includes gate lines and edge circuits 226 in the border area and pixel circuits 228 in the active area;
- a layer of thin-film transistor (TFT) glass 230; and
- a backlight 232 that spans the active area and may overlap into the border area.

Transflective color displays offer the ability to convey information in both a reflective mode as well as via a transmissive mode that operates by using the backlight 232. Note that no information is conveyed in the non-addressable pixels of the border area. In transmissive mode 240, light from the backlight 232 shines through the holes in the reflector layer, and is modified by the liquid crystal layer 216, which is controlled by the pixel circuits 228. The modified light then passes through a transmissive area 242 in the color filters (212-214) and through the polarizer 210. The system converts the white backlight into specific colors by controlling the intensity of light that passes through the liquid crystal display and which is directed into the red, green, and blue filters of the transmissive area.

In reflective mode 244, ambient light passes through the polarizer and color filter layers (210-214) and is modified in intensity by the liquid crystal layer 216. The modified light then reflects off of the reflector layer 222 to exit through the display by passing back through the above-mentioned layers a second time. The reflected light enters through the reflective area 246 in the color filters (212-214), which is distinct and offset from the transmissive area 242.

While both the reflective and transmissive areas are present in the active area of the display, within the border area the transmissive areas are instead replaced by a black mask 248. Note that the reflective areas are present in both the active and border areas, but are only actually used to convey information in the active area.

Matching Reflectivity in Transflective Displays

Figure 3:
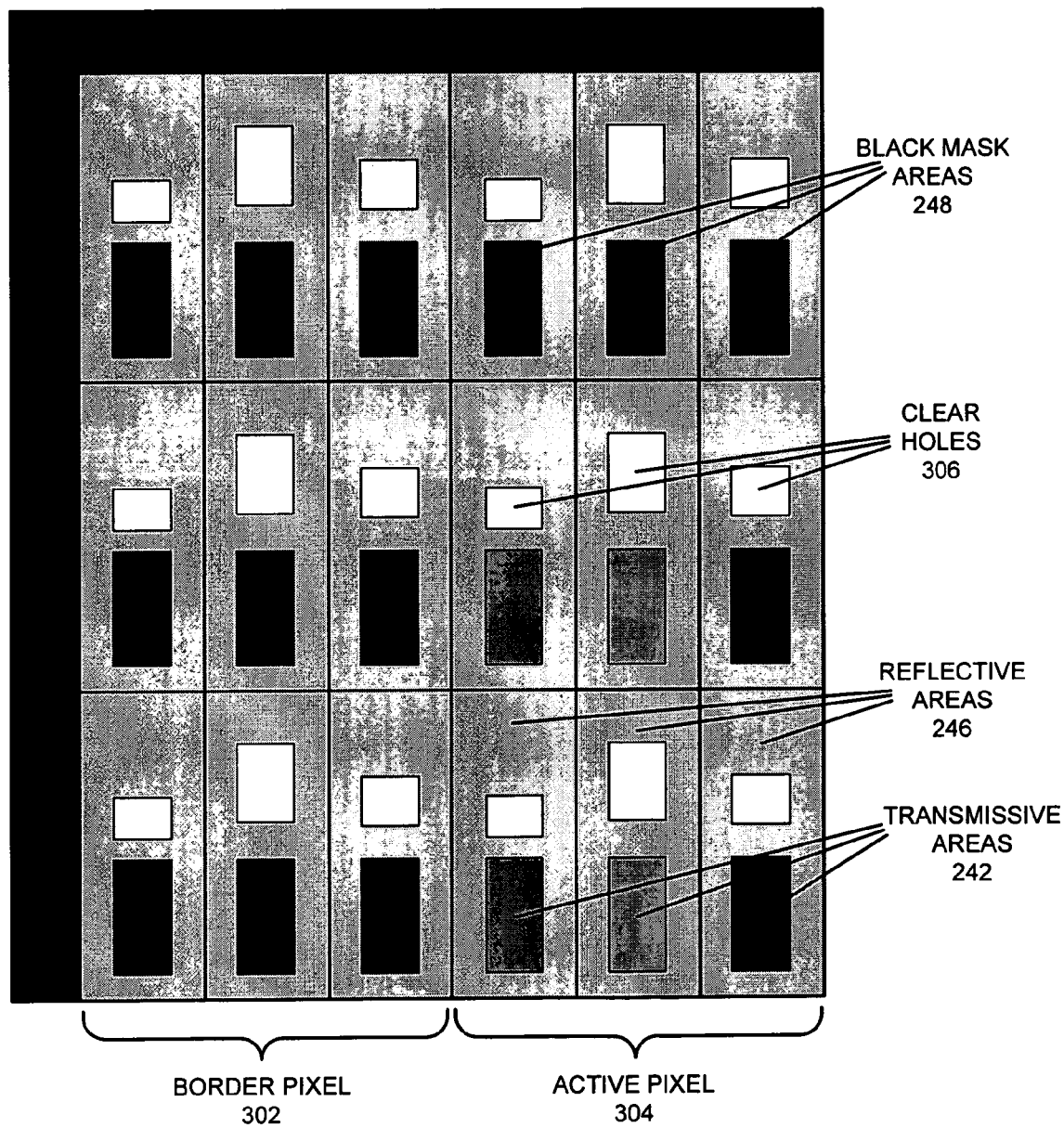
FIG. 3 illustrates a frontal view of border pixels with black masks in contrast to active area pixels with transmissive areas in accordance with an embodiment of the present invention.

FIG. 3 illustrates a frontal view of border pixels that contain a color filter and reflector pattern that are substantially the same as that of the active area, with a black mask 248 placed in the transmissive areas. Within a given border pixel 302, a black mask area 248 whose size and location within the pixel are substantially the same as those of a corresponding transmissive area in a pixel of the active area 304 reduces the reflectivity of the border pixel. Since the black mask often reflects less light than a transmissive area of substantially the same size, due to some limited amount of reflectivity from the backlight in the transmissive area, the size of the black mask is typically adjusted (reduced) to match the reflectivity of the transmissive area. Thus, the size and location of the black mask areas in pixels of the border region can be tuned to increase or decrease the reflectivity of the border area as desired.

In reflective mode, some amount of light is lost as the ambient light passes through the layers of the screen, reflects against the reflector layer, and then passed out through the screen again. Less light is lost in transmissive mode, since the light only passes through the screen once. An additional area can be provided in each sub-pixel to improve the brightness of the display in reflective mode. For example, "clear holes" 306 in each sub-pixel contain no filters or masks, and allow ambient light to pass through and reflect unimpeded from the reflector layer. These clear holes, which may be of different size for each type (red, green, or blue) of sub-pixel, provide an adjustment mechanism that allows the color purity of the reflective mode to match the color purity of the transmissive mode more closely. As a secondary effect, the use of clear holes also results in additional reflection through the color filters as well.

In general, clear holes improve reflectivity, resulting in a brighter display and white point, higher contrast, and better color mixing. Furthermore, the size and location of the clear holes within each given pixel of the border area can additionally be modified to further match the reflectivity of pixels in the border area with pixels of the active area.

Figure 4:
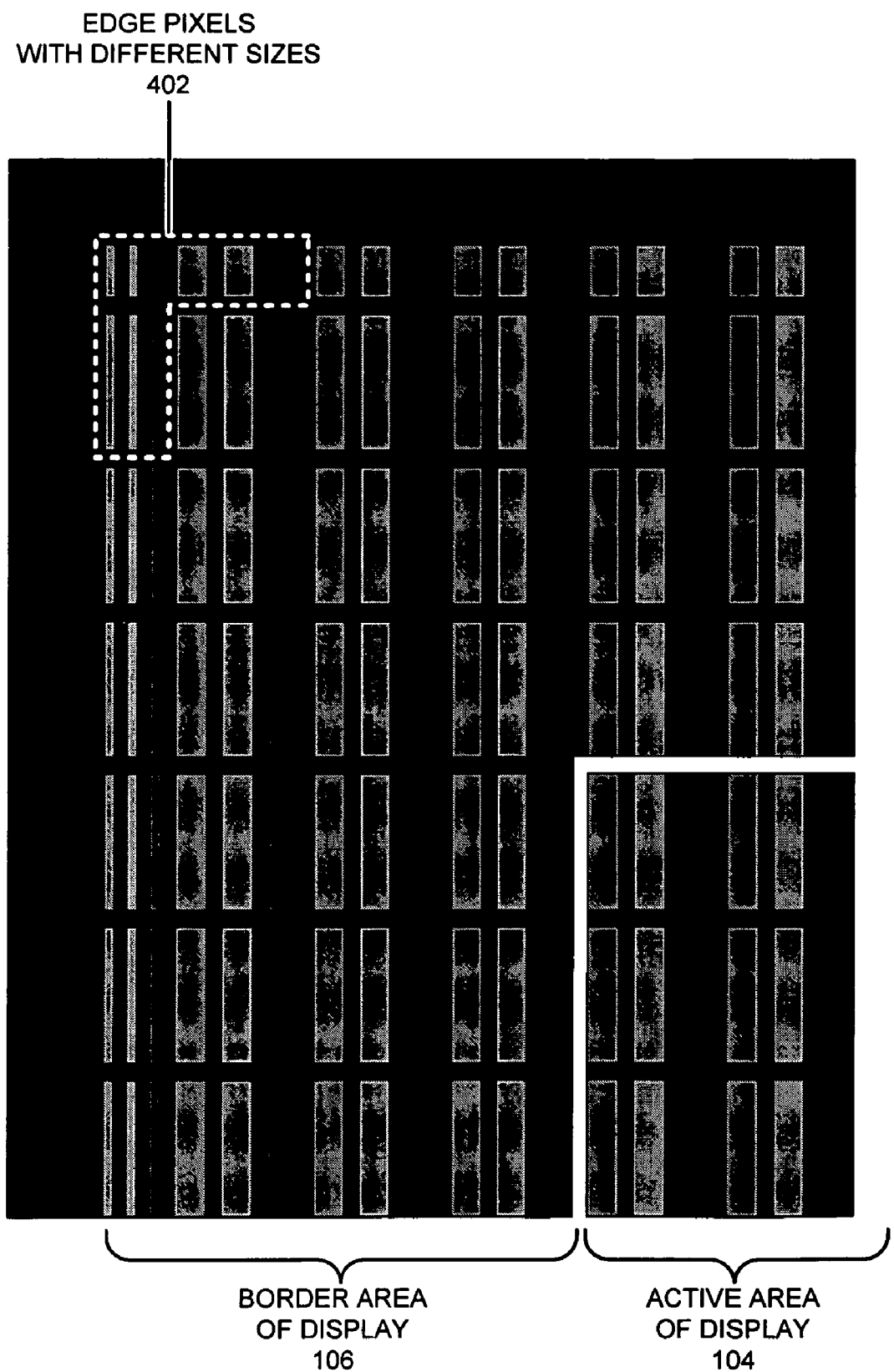
FIG. 4 illustrates border pixels having different sizes in accordance with an embodiment of the present invention.

The size of pixels in the border area can also be used to adjust the reflectivity of the region. For example, FIG. 4 illustrates edge pixels whose sizes are modified 402 to fit the display area. Resizing options include scaling the edge pixels to fit, as shown in FIG. 4, or uniformly resizing the border pixels so that a discrete number of same-size pixels fill the border region. Since changing the size of a pixel changes the size and pitch of the reflective area, clear holes, and black mask, and thus changes the aperture ratio of the pixel, this technique provides an additional mechanism for changing the reflectivity of the border region to match the active area.

A further set of mechanisms for adjusting the reflectivity of the border area involves modifying the cell gap and the surface roughness of the reflector layer in the border area. For the former case, the cell gap, or the distance between the CFG layer and the reflector layer, can be varied in the border area from the cell gap in the active area.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A transfective display in which a border area adjacent to an active area has a reflectivity substantially similar to the active area when the display is turned off, comprising:
    a polarizer layer;
    a color filter glass (CFG) layer which contains color filters in the active area;

a liquid crystal layer; and a reflector layer wherein the border area of the CFG layer is fabricated to have a reflectivity that is substantially the same as the active area, thereby making the border area visually indistinguishable from the active area when the display is turned off.

2. The transflective display of claim 1, wherein a given active pixel in the active area of the CFG layer includes a transmissive hole for transmitting color via a backlight; and wherein a given border pixel in the border area of the CFG layer includes a black mask area whose size and location within the given border pixel are substantially the same as those of the transmissive hole for a pixel in the active area.

3. The transflective display of claim 2, wherein the size and location of the black mask area within the given border pixel is adjusted to match the reflectivity of a pixel in the active area when the display is turned off.

4. The transflective display of claim 1, wherein a given pixel in the CFG layer includes a clear hole that allows ambient light to reflect directly off of the reflector layer;

wherein the clear hole can be adjusted in size to tune the color point of the given pixel; and wherein the size of a clear hole in the border area varies from the size of a clear hole in the active area in order to adjust the reflectivity in the border area to be substantially the same as in the active area when the display is turned off.

5. The transflective display of claim 1, wherein the pixel size in the border area is different from the pixel size in the active area; and wherein varying the pixel size can adjust the pixel's light aperture ratio and can thereby change the pixel's reflectivity.

6. The transflective display of claim 5, wherein the size of pixels in the border area can vary.

7. The transflective display of claim 1, wherein the cell gap is the distance between the CFG layer and the reflector layer; and wherein the cell gap in the border area varies from the cell gap in the active area; and wherein changing the cell gap in the border area changes the reflectivity of the border area.

8. The transflective display of claim 1, wherein the surface roughness of the reflector layer in the border area varies from the surface roughness of the reflector layer in the active area in order to modify the reflectivity of the border area.

9. A method for manufacturing a transflective display in which a border area adjacent to an active area has a reflectivity substantially similar to the active area when the display is turned off, the method comprising:

forming a polarizing layer;

forming a color filter glass (CFG) layer which contains color filters in the active area;

forming a liquid crystal layer; and forming a reflector layer;

wherein the border area of the CFG layer is fabricated to have a reflectivity that is substantially the same as the active area, thereby making the border area visually indistinguishable from the active area when the display is turned off.

10. The method of claim 9, wherein a given active pixel in the active area of the CFG layer includes a transmissive hole for transmitting color via a backlight; and wherein a given border pixel in the border area of the CFG layer includes a black mask area whose size and location within the given border pixel are substantially the same as those of the transmissive hole for a pixel in the active area.

11. The method of claim 10, wherein the size and location of the black mask area within the given border pixel is adjusted to match the reflectivity of a pixel in the active area when the display is turned off.

12. A computing device that includes:

a computational engine;

a memory-based storage system; and a transflective display used to present information;

wherein the transflective display includes a border area adjacent to an active area;

wherein the border area is fabricated to have a reflectivity that is substantially the same as the active area, thereby making the border area visually indistinguishable from the active area when the display is turned off.

13. The computing device of claim 12, wherein the transflective display includes:

a polarizer layer;

a color filter glass (CFG) layer which contains color filters in the active area;

a liquid crystal layer; and a reflector layer;

wherein the border area of the CFG layer is fabricated to have a reflectivity that is substantially the same as the active area.

14. The computing device of claim 13, wherein a given active pixel in the active area of the CFG layer includes a transmissive hole for transmitting color via a backlight; and wherein a given border pixel in the border area of the CFG layer includes a black mask area whose size and location within the given border pixel are substantially the same as those of the transmissive hole for a pixel in the active area.

15. The computing device of claim 14, wherein the size and location of the black mask area within the given border pixel is adjusted to match the reflectivity of a pixel in the active area when the display is turned off.

16. The computing device of claim 13, wherein a given pixel in the CFG layer includes a clear hole that allows ambient light to reflect directly off of the reflector layer;

wherein the clear hole can be adjusted in size to tune the color point of the given pixel; and wherein the size of a clear hole in the border area varies from the size of a clear hole in the active area in order to adjust the reflectivity of the border area to be substantially the same as in the active area when the display is turned off.

17. The computing device of claim 13, wherein the pixel size in the border area is different from the pixel size in the active area; and wherein varying the pixel size can adjust the pixel's light aperture ratio and can thereby change the pixels reflectivity.

18. The computing device of claim 17, wherein the size of pixels in the border area can vary.

19. The computing device of claim 13,
wherein the cell gap is the distance between the CFG layer and the reflector layer; and
wherein the cell gap in the border area varies from the cell gap in the active area; and
wherein changing the cell gap in the border area changes the reflectivity of the border area.

20. The computing device of claim 13, wherein the surface roughness of the reflector layer in the border area varies from the surface roughness of the reflector layer in the active area in order to modify the reflectivity of the border area.

* * * * *